(12) United States Patent
Raphael et al.

(10) Patent No.: US 11,590,720 B2
(45) Date of Patent: Feb. 28, 2023

(54) METHOD FOR THE SIMULTANEOUS PRODUCTION OF TWO OR MORE FIBER COMPOSITE COMPONENTS AND FIBER COMPOSITE COMPONENT

(71) Applicant: Wobben Properties GmbH, Aurich (DE)

(72) Inventors: Reinhard Raphael, Ihlow (DE); Christian Freese, Südbrookmerland (DE)

(73) Assignee: Wobben Properties GmbH, Aurich (DE)

( * ) Notice: Subject to any disclaimer, the term of this patent is extended or adjusted under 35 U.S.C. 154(b) by 557 days.

(21) Appl. No.: 16/607,915

(22) PCT Filed: Mar. 23, 2018

(86) PCT No.: PCT/EP2018/057507
§ 371 (c)(1),
(2) Date: Oct. 24, 2019

(87) PCT Pub. No.: WO2018/197124
PCT Pub. Date: Nov. 1, 2018

(65) Prior Publication Data
US 2020/0094488 A1 Mar. 26, 2020

(30) Foreign Application Priority Data
Apr. 26, 2017 (DE) .................... 10 2017 108 902.0

(51) Int. Cl.
*B29C 70/30* (2006.01)
*B29C 70/48* (2006.01)
(Continued)

(52) U.S. Cl.
CPC ...... *B29D 99/0028* (2013.01); *B29C 37/0075* (2013.01); *B29C 70/30* (2013.01);
(Continued)

(58) Field of Classification Search
CPC . B29C 37/0067; B29C 37/0075; B29C 70/30; B29C 70/443; B29C 70/48;
(Continued)

(56) References Cited

U.S. PATENT DOCUMENTS 2,778,761 A 1/1957 Frieder et al.
4,229,473 A * 10/1980 Elber .................. B32B 7/04
428/140

(Continued)

FOREIGN PATENT DOCUMENTS

CN 101021202 A 8/2007
CN 101267934 A 9/2008
(Continued)

OTHER PUBLICATIONS

Martin Perterer, "Schadensidentifikation und -bewertung von CFK-Bauteilen mittels phasenmodulierter Thermographie", Dissertation, Apr. 10, 2012, 201 pages (with an English Abstract on p. 5).

Primary Examiner — John M Zaleskas
(74) Attorney, Agent, or Firm — Seed Intellectual Property Law Group LLP

(57) ABSTRACT

A method for the simultaneous production of two or more fiber composite components, to a fiber composite component, to a rotor blade of a wind power installation, as well as to a wind power installation. A method for the simultaneous production of two or more fiber composite components, in particular of two or more substantially identical fiber composite components which have a component contour, the method comprising providing at least one fibrous material, at least one planar separation element, and at least one matrix material, wherein the at least one planar separation element at least in portions is permeable to the matrix material; producing a semi-finished fibrous pack by disposing the fibrous material layer-by-layer so as to form semi-finished fibrous products stacked on top of one another, (Continued)

wherein at least one of the planar separation elements is in each case disposed between the semi-finish fibrous products; infusing the semi-finished fibrous pack with the matrix material; cutting the component contour into the infused semi-finished fibrous pack.

13 Claims, 6 Drawing Sheets

(51) Int. Cl.
    *B29D 99/00*     (2010.01)
    *B29C 37/00*     (2006.01)
    *B29B 11/16*     (2006.01)
    *B29C 70/44*     (2006.01)
    *B29C 70/54*     (2006.01)
    *B29L 31/08*     (2006.01)
    *B29L 31/30*     (2006.01)
    *F03D 1/06*     (2006.01)

(52) U.S. Cl.
    CPC ............... *B29C 70/48* (2013.01); *B29B 11/16* (2013.01); *B29C 70/443* (2013.01); *B29C 70/545* (2013.01); *B29C 70/547* (2013.01); *B29L 2031/085* (2013.01); *B29L 2031/3076* (2013.01); *B32B 2260/046* (2013.01); *F03D 1/0675* (2013.01)

(58) Field of Classification Search
    CPC ..... B29C 70/545; B29C 70/547; B29B 11/16; B32B 2260/046; F03D 1/0675; B29D 99/0028; Y02E 10/72; B29L 2031/085; B29L 2031/3076
    See application file for complete search history.

(56) References Cited

U.S. PATENT DOCUMENTS

| | | | | |
|---|---|---|---|---|
| 4,274,901 A | * | 6/1981 | Elber | B29C 70/34 156/290 |
| 4,908,494 A | * | 3/1990 | Faiz | B23K 26/40 219/121.72 |
| 6,048,488 A | * | 4/2000 | Fink | B29C 70/48 264/102 |
| 8,142,583 B2 | | 3/2012 | Filsinger et al. | |
| 8,402,652 B2 | | 3/2013 | Bakhuis et al. | |
| 8,486,555 B2 | | 7/2013 | Usami et al. | |
| 8,636,936 B2 | | 1/2014 | Modin et al. | |
| 9,957,949 B2 | | 5/2018 | Kybelund | |
| 10,293,586 B2 | | 5/2019 | Passmann et al. | |
| 10,487,797 B2 | | 11/2019 | Hancock et al. | |
| 10,800,116 B2 | * | 10/2020 | Granger | B29C 70/545 |
| 2003/0090025 A1 | * | 5/2003 | Nelson | B29C 70/086 264/277 |
| 2007/0107220 A1 | * | 5/2007 | Bakhuis | B29C 70/086 29/889.7 |
| 2009/0311487 A1 | * | 12/2009 | Filsinger | B29C 70/086 156/169 |
| 2010/0104447 A1 | * | 4/2010 | Eyb | B29C 70/08 416/230 |
| 2011/0100540 A1 | * | 5/2011 | Mathew | B29D 99/0014 156/245 |
| 2012/0027609 A1 | * | 2/2012 | Ogde | B29C 70/545 29/889.71 |
| 2012/0039720 A1 | * | 2/2012 | Bech | B29C 70/302 156/243 |
| 2012/0244006 A1 | * | 9/2012 | Passmann | B32B 27/40 156/306.9 |
| 2014/0301859 A1 | * | 10/2014 | Hancock | B29D 99/0025 156/60 |
| 2014/0328690 A1 | * | 11/2014 | Kybelund | B32B 3/266 29/889.71 |
| 2015/0360426 A1 | * | 12/2015 | Radanitsch | B29C 70/547 264/78 |
| 2016/0047252 A1 | * | 2/2016 | Merzhaeuser | B29C 70/00 156/247 |
| 2016/0146184 A1 | * | 5/2016 | Caruso | F03D 1/0675 156/60 |
| 2016/0146185 A1 | * | 5/2016 | Yarbrough | B32B 5/22 156/242 |
| 2017/0002791 A1 | * | 1/2017 | Yarbrough | B32B 5/02 264/78 |
| 2018/0043648 A1 | | 2/2018 | Wo et al. | |
| 2018/0223798 A1 | * | 8/2018 | Caruso | B29D 99/0025 |
| 2018/0372065 A1 | * | 12/2018 | Livingston | B29C 70/48 |
| 2019/0001592 A1 | * | 1/2019 | Nielsen | F03D 80/30 |
| 2019/0010918 A1 | * | 1/2019 | Riahi | B32B 37/14 |
| 2019/0353143 A1 | * | 11/2019 | Girolamo | B29D 99/0003 |

FOREIGN PATENT DOCUMENTS

| | | |
|---|---|---|
| CN | 101495296 A | 7/2009 |
| CN | 104129082 A | 11/2014 |
| CN | 104149359 A | 11/2014 |
| DE | 102004017888 A1 | 11/2005 |
| DE | 102014224720 A1 | 6/2016 |
| EP | 2317126 A2 | 5/2011 |
| JP | 2008272959 A | 11/2008 |
| JP | 2013201322 A | 10/2013 |
| JP | 2015500942 A | 1/2015 |
| RU | 2549070 C9 | 11/2015 |
| WO | 2016/142402 A1 | 9/2016 |

\* cited by examiner

METHOD FOR THE SIMULTANEOUS PRODUCTION OF TWO OR MORE FIBER COMPOSITE COMPONENTS AND FIBER COMPOSITE COMPONENT

BACKGROUND

Technical Field

The invention relates to a method for the simultaneous production of two or more fiber composite components, to a fiber composite component, to a rotor blade of a wind power installation and to a wind power installation.

Description of the Related Art

Fiber composite components of the type mentioned at the outset are composed substantially of fiber composite materials, or only comprise the latter. Fiber composite materials have substantially two major component parts. The major components parts in most instances are at least one matrix material and fibers, wherein the major component parts have mutual interactions in such a manner that the fiber composite material typically has properties of higher quality than either of the other two individual participating major component parts.

The matrix material configures the matrix of the fiber composite material which holds the fibers in their position and transmits and distributes stresses between the fibers. The matrix furthermore serves for protecting the fibers from externally acting mechanical and/or chemical influences. The strength of the fiber composite material is typically determined substantially by the fibers, wherein the strength furthermore, as a function of the fiber profile in the matrix, is either direction-dependent, that is to say anisotropic, or direction-independent, that is to say isotropic.

One challenge in terms of the production technology in the field of fiber composite components lies in particular also in that the separation of fiber composite materials, for example by sawing, turning, or milling, is complex. Firstly, the wear on the tools in the case of methods of this type for separating fiber composite components is high, and secondly, the qualitative result is also in most instances not satisfactory. The separating of fiber composite materials can take place using the method of water-jet cutting, wherein the quality of the separation result here too offers a potential for improvement, for example in terms of the accuracy of the contour. Furthermore, the existing separation methods are often associated with high costs.

The German patent and trademark office has identified the following prior art when researching the priority application pertaining to the present application: DE 10 2014 224 720 A1, and Martin Perterer: Schadensidentifikation und -bewertung von CFK-Bauteilen mittels phasenmodulierter Thermographie. Dissertation, Apr. 10, 2012, 214 (Martin Perterer: Identification and assessment of damage to CFRP components by means of phase-modulated thermal graphics. Thesis, Oct. 4, 2012, 214).

BRIEF SUMMARY

Provided is a method for the simultaneous production of two or more fiber composite components, a fiber composite component, a rotor blade of the wind power installation, as well as a wind power installation which minimize or eliminate one or a plurality of the disadvantages mentioned. Provided is a method which enables the production of two or more fiber composite components at lower costs and/or at higher volumes and/or in higher quality. Provided is a method which increases the efficiency of resources in the production of two or more fiber composite components.

According to a first aspect of the invention, provided is a method for the simultaneous production of two or more fiber composite components, in particular of two or more substantially identical fiber composite components, which has a component contour, said method comprising providing at least one fibrous material, at least one planar separation element, and at least one matrix material, wherein the at least one planar separation element at least in portions is permeable to the matrix material; producing a semi-finished fibrous pack by disposing the fibrous material layer-by-layer so as to form semi-finished fibrous products stacked on top of one another, wherein at least one of the planar separation elements is in each case disposed between the semi-finished fibrous products; infusing the semi-finished fibrous pack with the matrix material; cutting the component contour into the infused semi-finished fibrous pack.

The invention is based inter alia on the insights pertaining to existing production methods set forth hereunder.

Fiber composite components can be generated by means of different production methods. One method for producing typically high-quality fiber composite components is vacuum infusion. In the case of vacuum infusion, an arrangement of substantially dry fibrous material which is present in particular as a multiplicity of rovings is surrounded by a film, in particular surrounded so as to be substantially fluid-tight, so as to evacuate the space surrounded by the film, typically with the aid of a vacuum pump. Consequently, the disposed dry fibrous material has substantially no more air. The air pressure furthermore compresses the inserted parts and moreover sets said inserted parts.

The actual infusion takes place by means of providing and supplying temperature-controlled liquid matrix material which is suctioned into the fibrous material on account of the applied vacuum. Once the fibers have been completely soaked with the matrix material the supply of the matrix material is interrupted, and the soaked fiber composite material can be demolded after curing. The production of fiber composite components of this type by means of vacuum infusion does indeed generate components of high quality, on the one hand, but is associated with high complexity, and automating the method is possible to only a limited extent.

The material removal when separating by means of a fluid jet, for example by means of water jet cutting, is based on the high-pressure which is exerted on the workpiece by the jet. The water jet in water-jet cutting typically removes above all microscopic particles that are close to the surface, so that no elongations or reduced elongations by virtue of heat and/or machining forces arise within the workpiece. On account of the removal of particles that are close to the surface, the waterjet over time can extend completely through a component so that said component can be separated or cut, respectively. The term surface in this context is in particular be understood as the surface that faces the waterjet in the cutting zone.

In the separation by means of a fluid jet, in particular in water-jet cutting, there is a fundamental difference between pure water/pure fluid cutting and abrasive cutting. The jet in abrasive cutting, apart from the fluid, in particular the liquid, in particular water, additionally comprises abrasive material. The quality of water-jet-cut fiber composite components often does not meet the quality requirements which are nowadays demanded in many sectors. Therefore, either a complex and cost-intensive bespoke fabrication is carried out, or further cost-intensive method steps are carried out after water-jet cutting.

The invention is in particular based on the concept that the water flowing off transversely from the active location, in particular transversely to the actual flow direction of the waterjet, additionally causes shear forces which likewise contribute toward the removal of material. However, these shear forces in particular cannot lead to exclusively straight separation locations. Furthermore, undesirable consequences such as, for example, a burr or a poor surface quality, can arise.

The semi-finished fibrous pack is produced inter alia by disposing the fibrous material layer-by-layer so as to form semi-finished fibrous products stacked on top of one another. The semi-finished fibrous products comprise in particular fibrous material layered on top of one another. Within the semi-finished fibrous pack, the separation, or the differentiation, respectively, of two neighboring semi-finished fibrous products can take place on account of the disposal of the planar separation element between said semi-finished fibrous products. There is furthermore the possibility of the disposal of fibrous mats such that a differentiation of the semi-finished fibrous products is also enabled prior to the disposal of the separation elements.

A construction of the semi-finished fibrous pack can be commenced by disposing the fibrous material layer-by-layer so as to form a semi-finished fibrous product, for example. A separation element can thereupon be disposed on the fibrous material layer that lies on the very top, and fibrous material can in turn be disposed layer-by-layer thereon so as to form a semi-finished fibrous product. By carrying out the above-mentioned steps multiple times, a semi-finished fibrous pack having a multiplicity of semi-finished fibrous products which are disposed on top of one another and are substantially mutually separated by a separation element can then be produced. Infusing the semi-finished fibrous pack with the matrix material can be carried out by means of various infusion methods known in the prior art. Cutting the component contour into the infused semi-finished fibrous pack can be carried out, for example, by means of water jet cutting, spark-erosion cutting, sawing, and further methods.

The planar separation element at least in portions is permeable to the matrix material such that the matrix material can also flow through the semi-finished fibrous pack in the direction of a surface orthogonal of the separation element, for example. The semi-finished fibrous pack is typically substantially evacuated during infusing, this enabling that matrix material can flow into the semi-finished fibrous pack. In order for the evacuation and the flow of the matrix material to be able to take place, it is preferable that the planar separation element is configured for permitting the evacuation, on the one hand, and furthermore for enabling a flow of the matrix material. Furthermore preferably, the planar separation element is configured as a netted woven fabric. It is moreover preferable that the separation element is configured as a permeable woven fabric and/or as a mesh element and/or as a chemical barrier layer and/or as an adhesive layer. In a further preferred refinement of the method it is provided that the separation element has passage openings.

The fiber composite components to be produced are released by cutting the component contour into the infused semi-finished fibrous pack. High-quality cutting of the component contour can take place on account of cutting the component contour into the infused semi-finished fibrous pack. Fiber composite components having high-quality separation locations can be produced in particular when applying water-jet cutting. The invention is based inter alia on the concept that the waterjet entering a semi-finished fibrous pack or fiber composite components disposed on top of one another is deflected only after the first semi-finished fibrous product or after the first fiber composite component in such a manner that the waterjet exerts a water pressure orthogonal to the envisaged jet direction, or has directional components which are not parallel to the envisaged jet direction, respectively. Since the semi-finished fibrous products in the semi-finished fibrous pack, or the fiber composite components disposed on top of one another, in the prior art are substantially not fixedly connected to one another and air gaps are typically present therebetween, said semi-finished fibrous products or fiber composite components are further mutually separated by the waterjet so that the waterjet can propagate between the semi-finished fibrous products. In particular, the waterjet cannot be displaced through the semi-finished fibrous products or fiber composite components in an uncontrolled or poorly controlled manner.

As a result thereof, an intermediate space between the semi-finished fibrous products or the fiber composite components disposed on top of one another is widened. On account thereof, the waterjet loses pressure for cutting the remaining semi-finished fibrous products or fiber composite components that are disposed below the initially cut semi-finished fibrous product or fiber composite component. As a result, the cutting quality is poor in particular in semi-finished products of the semi-finished fibrous pack or fiber composite components that lie lower than in the upper region of the semi-finished fibrous pack or the fiber composite components disposed on top of one another. These disadvantages are solved when separating an infused semi-finished fibrous pack having separation elements since there is substantially no intermediate space or a very reduced intermediate space, or no air layer or a very reduced air layer, respectively, that can be widened by the waterjet between the semi-finished fibrous products. Apart from the increased effectiveness, the efficiency of the production of fiber composite components can furthermore be increased since two or more infused semi-finished fibrous products disposed on top of one another can be cut with high quality in one common operated step by way of the method according to the invention. Currently, a single fiber composite component is cut in most instances in the case of high quality requirements.

The component contour is in particular be understood as the contour line of the fiber composite components as is cut or released, respectively, from the semi-finished fibrous pack. The composite contour is also the substantially two-dimensional displacement path which a cutting tool, in particular a waterjet, has to travel so as to separate the fiber composite components from the infused semi-finished fibrous pack.

In a preferred refinement of the method it is provided that said method comprises separating the infused semi-finished fibrous pack at the separation elements. The fiber composite components are harvested by separating the infused semi-finished fibrous pack at the separation elements. The fiber composite components have been created on account of the infused semi-finished fibrous products, wherein the separation elements are now still disposed between the now infused semi-finished fibrous products in the infused semi-finished fibrous pack. The fiber composite components can be retrieved with little complexity on account of the infused semi-finished fibrous pack being separated at the separation elements and on account of the prior cutting of the component contour into the infused semi-finished fibrous pack. Separating the individual fiber composite components from one another would not be possible by way of simple steps without the separation elements between the semi-finished fibrous products, or after the infusion between the fiber composite components, respectively.

In one preferred variant of embodiment of the method it is provided that a fluid which preferably comprises an abrasive material is used for the cutting. The flow is furthermore preferably configured as a liquid, furthermore preferably as water, and moreover preferably in the form of a jet, in particular of a directed jet. The directed fluid jet preferably has a pressure of more than 600 bar. It is in particular preferable that the pressure is more than 1000 bar, and/or more than 1500 bar, and/or more than 2000 bar.

Furthermore preferably, it is provided that the separation element is configured as a barrier film and preferably has a multiplicity of passage openings, wherein the passage openings are preferably distributed uniformly on the barrier film, and/or wherein the barrier film is preferably composed of or comprises polyethylene (PE), in particular low density polyethylene (LDPE). A barrier film is in particular be understood to be a separation element which comprises an extremely thin material. The thickness of the material is in particular by a multiple smaller than the extents in one of the directions of the planar extent. The barrier film can furthermore also be composed of or comprise a material that is permeable to a matrix material.

The passage openings in the barrier film result in the barrier film to be permeable to the matrix material. The barrier film having a multiplicity of passage openings thus facilitates the quality of the infusion in that the matrix material can also flow through the semi-finished fibrous pack in a manner orthogonal to the planar extent of the separation element. Moreover, a barrier film configured in such a manner can also facilitate the separation of the infused semi-finished fibrous pack at the separation elements in that the adhesive effect between two neighboring fiber composite components on account of the barrier film is so minor that the fiber composite components are separable from one another with as little effort as possible.

One further particularly preferred variant of embodiment of the method provides that the separation element is composed of or comprises separation element portions, and the separation element portions are disposed in portions between the neighboring semi-finished fibrous products. It is in particular preferable that two or more separation element portions are disposed in portions between the neighboring semi-finished fibrous products. There is therefore the possibility for separation element portions that are impermeable to the matrix material to also be used, wherein the permeability to the matrix material is achieved by the portion-wise disposal of the separation element portions.

One further preferred refinement of the method provides that the separation element is disposed completely between two neighboring semi-finished fibrous products. Furthermore preferably, the separation element is disposed completely within the component contour to be cut between two neighboring semi-finished products. The separation element can also project on the sides of the semi-finished fibrous pack. The separation element is in particular disposed in each case between all neighboring semi-finished fibrous products.

One further particularly preferred variant of embodiment of the method provides that a cutting direction is aligned so as to be substantially parallel to a surface orthogonal of the planar separation element, and/or the cutting direction is aligned at an angle to the surface orthogonal of the planar separation element. A cutting direction is to be understood, for example, as the direction of the liquid jet, or of the fluid jet, or of the waterjet, respectively. The advancing direction in the cutting method is however aligned so as to be substantially orthogonal to the surface orthogonal of the planar separation element. Furthermore, the advancing direction in the cutting method can be aligned in one of the directions of the planar extent of the separation element and/or of the infused semi-finished fibrous products.

It is in particular preferable that the two or more fiber composite components have a planar geometry. A planar geometry is in particular to be understood as a geometry of which the planar extent is a multiple of the thickness of the component.

According to one further preferred variant of embodiment of the method it is provided that the matrix material comprises or is composed of plastics material, and the plastics material preferably comprises or is composed of a thermoplastic material and/or a thermosetting plastics material, and/or comprises or is composed of ceramics, and/or comprises or is composed of cement, and/or comprises or is composed of concrete. It is furthermore provided that the matrix material comprises or is composed of metal, and/or comprises or is composed of carbon.

It is furthermore preferable that the fibrous material comprises or is composed of organic fibers, in particular carbon fibers, and/or the fibrous material comprises or is composed of inorganic fibers, in particular glass fibers, and/or the fibrous material comprises or is composed of natural fibers.

In one preferred refinement of the method it is provided that the fibrous material is configured as a woven fabric and/or a cross-laid fabric and/or a multi-axial cross-laid fabric, and/or an embroidered fabric and/or a non-woven fabric and/or mats and/or braided fabrics, and/or the fibers are present as rovings.

Inorganic fibers can furthermore be configured as basalt fibers, boron fibers, ceramic fibers, or steel fibers. Organic fibers can furthermore be selected from the group composed of aramid fibers, polyester fibers, and polyethylene fibers which are in particular selected as high-performance polyethylene (HPPE) fibers such as, for example Dyneema fibers. Natural fibers can be configured, for example, as hemp fibers, flax fibers, or sisal fibers.

According to one further aspect of the invention provided is a fiber composite component which is produced according to a method according to at least one of the variants of embodiment described above, said fiber composite component being in particular configured as a component of a rotor blade and/or a component of an aerospace vehicle, in particular of an aircraft, and/or a component of a nautical vehicle, in particular of a ship or a boat, and/or a component of a land vehicle, in particular of an automobile, and/or a component in the construction sector, and/or an insulation component for electronic components.

According to one further aspect of the invention, provided is a rotor blade of a wind power installation, having at least one fiber composite component which is produced according to a method according to at least one of the variants of embodiment described above.

According to one further aspect of the invention, provided is a wind power installation comprising a tower, a nacelle, and a rotor, wherein the tower and/or the nacelle and/or the rotor have/has a fiber composite component which is produced according to a method according to at least one of the variants of embodiment described above, or a rotor blade according to the preceding aspect.

In terms of further advantages, variants of embodiment, and details of the embodiment of these further aspects and their potential refinements, reference is also made to the description set forth above and to the corresponding features and refinements of the method.

BRIEF DESCRIPTION OF THE SEVERAL VIEWS OF THE DRAWINGS

Preferred embodiments of the invention will be explained in an exemplary manner by means of the appended figures in which.

DETAILED DESCRIPTION

Identical elements or elements of substantially identical or similar function are identified by the same reference signs in the figures.

Figure 1:
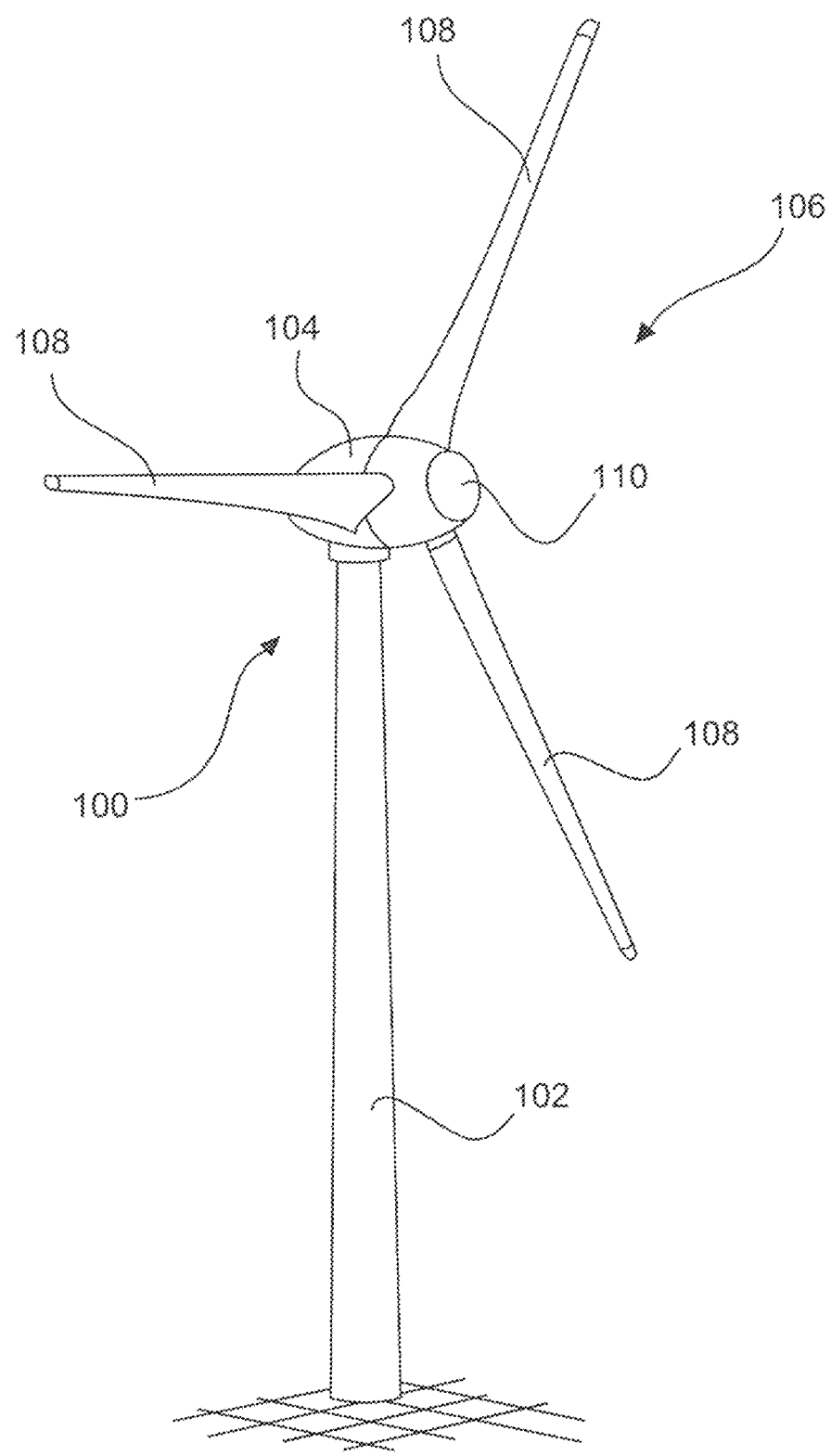
FIG. 1 shows a schematic three-dimensional view of an exemplary embodiment of wind power installation.

FIG. 1 shows a schematic three-dimensional view of an exemplary embodiment of a wind power installation. FIG. 1 shows a wind power installation 100 having a tower 102 and a nacelle 104. A rotor 106 having three rotor blades 108 and one spinner 110 is disposed on the nacelle 104. The rotor 106 when in operation is set in a rotating motion by the wind and on account thereof drives the generator in the nacelle 104. Fiber composite components which are produced by the method according to the invention for the simultaneous production of two or more fiber composite components can be utilized for various components of the wind power installation 100. For example, individual structural components of the rotor blades 108 can be produced from fiber composite components.

Figure 2:
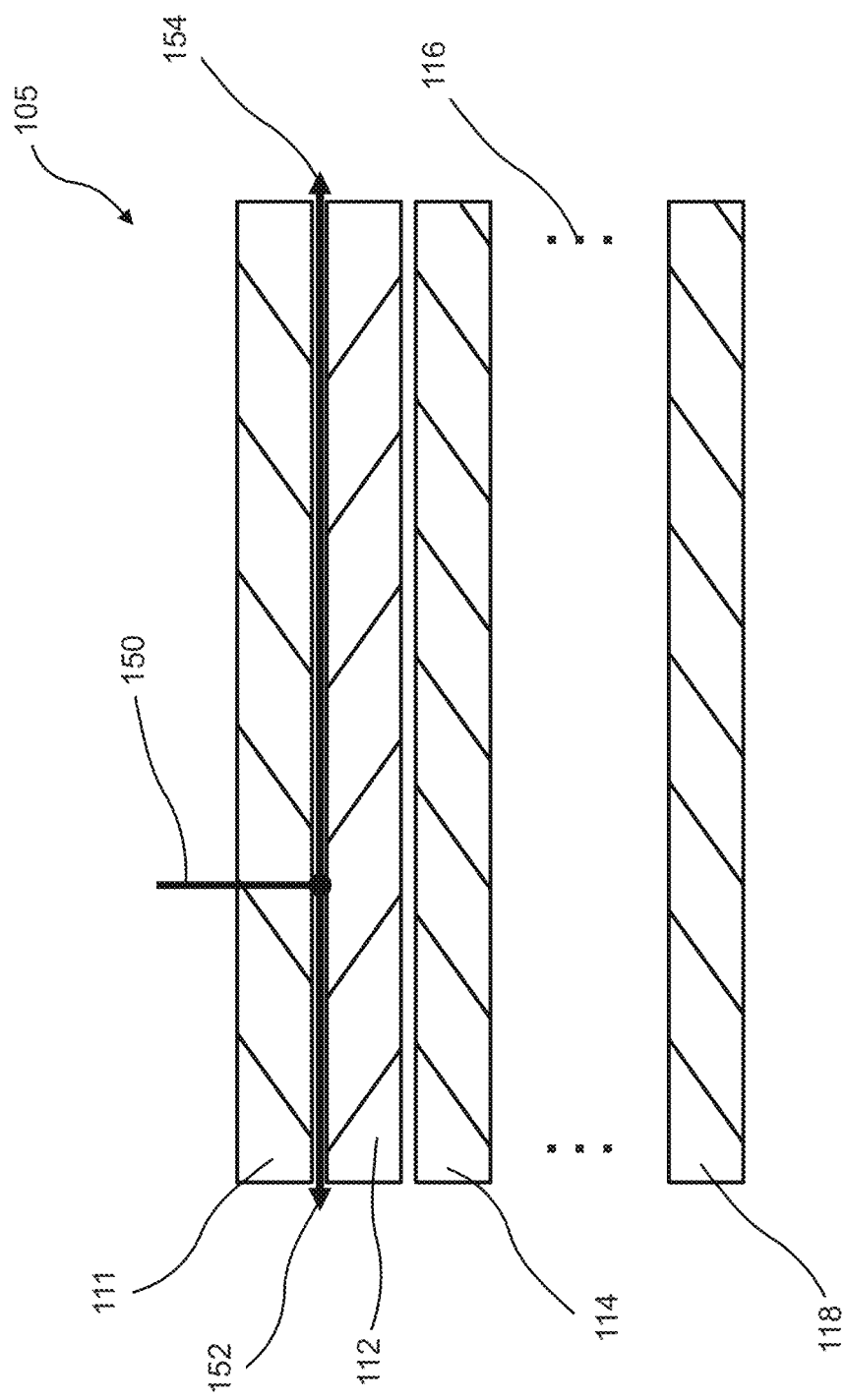
FIG. 2 shows a schematic two-dimensional view of a method, known in the prior art, for cutting fiber composite components.

FIG. 2 shows a schematic two-dimensional view of a method, known in the prior art, for cutting fiber composite components. A component pack 105 comprises a first fiber composite component 111, a second fiber composite component 112, a third fiber composite component 114, an nth fiber composite component 118, wherein a multiplicity of further fiber composite components 116 are disposed between the third fiber composite component 114 and the nth fiber composite component 118. The component pack 105 is composed substantially of fiber composite components that are disposed on top of one another. The fiber composite components 111-118 are substantially not connected to one another.

The component pack 105 is to be cut by the fluid jet 150 in the direction of the fluid jet direction so that the fiber composite components have a component contour. The fluid jet direction is aligned so as to be substantially parallel to a surface orthogonal of the fiber composite components 111-118. The invention is based inter alia on the concept that disadvantages when separating with a fluid jet arise in particular in the case of solutions to date according to the prior art that the fiber composite components 111-118 and in particular the first and the second fiber composite component 111, 112 are not connected to one another. The invention is based inter alia on the concept that this deficiency in the case of existing solutions is in particular caused in that the fluid jet is deflected and/or decelerated and/or stopped and/or is imparted a reduction in pressure on account of the air gap between the first and the second fiber composite component 111, 112. As a result thereof, the fluid jet cannot cut the contour through the plurality of fiber composite components in a controlled manner, or only with compromised precision, or even not at all penetrate all fiber composite components. A further effect of the deflection is that the fiber composite components 111-118 in the deflection plane, which is disposed so as to be substantially surface-parallel to the fiber composite components 111-118, are pushed apart and mutually displaced by the water pressure. As a result, relatively high-quality cutting by means of a fluid jet is not possible or possible only in a compromised manner.

Figure 3:
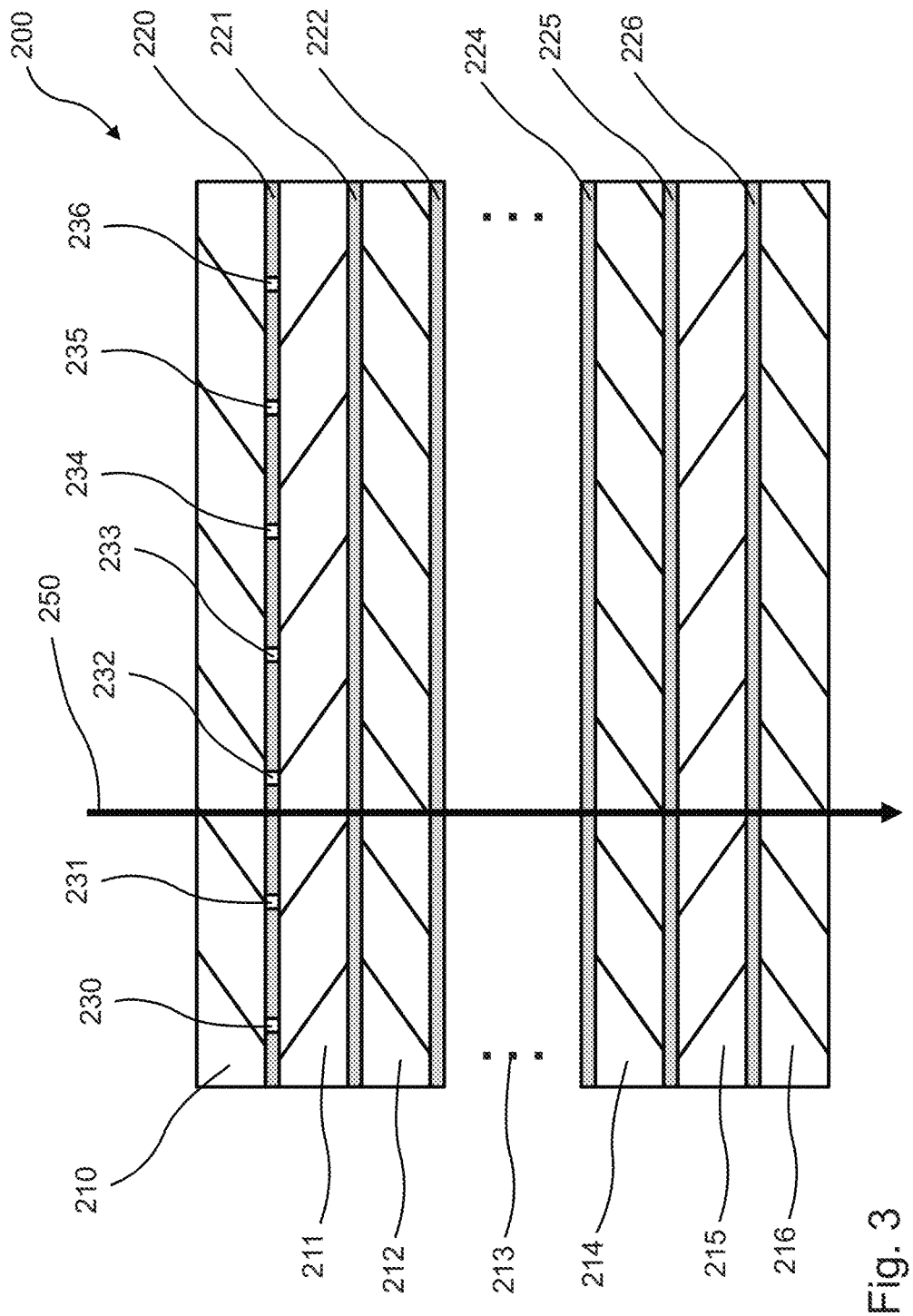
FIG. 3 shows a schematic two-dimensional view of an exemplary embodiment of the method for the simultaneous production of two or more fiber composite components.

These disadvantages can be reduced or avoided on account of the present invention and the advantageous design embodiments thereof. FIG. 3 shows a schematic two-dimensional view of an exemplary embodiment of the method for the simultaneous production of two or more fiber composite components. The infused semi-finished fibrous pack 200 comprises a first infused semi-finished fibrous product 210, a second infused semi-finished fibrous product 211, a third infused semi-finished fibrous product 212, a (n-2)th infused semi-finished fibrous product 214, a (n-1)th infused semi-finished fibrous product 215, and a nth infused semi-finished fibrous product 216, wherein a multiplicity of infused semi-finished fibrous products 213 having separation elements are disposed between the third infused semi-finished fibrous product 212 and the (n-2)th semi-finished fibrous product 214.

The infused semi-finished fibrous pack 200 moreover comprises separation elements 220-226 which are in each case disposed between two neighboring infused semi-finished fibrous products. The first separation element 220 is disposed for example between the first infused semi-finished fibrous product 210 and the second infused semi-finished fibrous product 211. The infused semi-finished fibrous pack 200 having the infused semi-finished fibrous products 210-216 and the separation elements 220-226 that are in each case disposed therebetween has been infused with said component parts. On account of the collective infusion of the semi-finished fibrous products 210-216, said semi-finished fibrous products 210-216 are fixedly disposed on one another. On account of this fixed disposal on one another, a cut of high quality can now be performed by means of a fluid jet 250, said quality pertaining to a low surface roughness and/or little burr, for example.

In order to be able to separate the infused semi-finished products 210-216 from one another again, the separation elements 220-226 are in each case disposed between said infused semi-finished fibrous products 210-216. The separation elements 220-226 have in each case a permeability to the matrix material. This permeability enables a high-quality infusion of the semi-finished fibrous pack 200 to be achieved. A plurality of passage openings 230-236 are illustrated in an exemplary manner for the first separation element 220. Each of the separation elements 220-226 preferably has a plurality of passage openings. The passage openings of the first separation element 220 here are presently illustrated in a schematic manner since a permeability to the matrix material in the separation elements 220-226 can preferably be achieved by a very large number of passage openings. For example, a permeability of the barrier film can be achieved by way of a corresponding material, for example a woven fabric or a perforated film. Alternatively, the separation element preferably comprises two or more separation element portions, wherein the separation element portions are preferably disposed in such a manner that a permeability to the matrix material exists between said separation element portions. As a result, the separation element, or the two or a plurality of separation element portions, respectively, can be composed of or comprise a matrix-impermeable material, since the matrix material can make its way through between the separation element portions.

Figure 4:
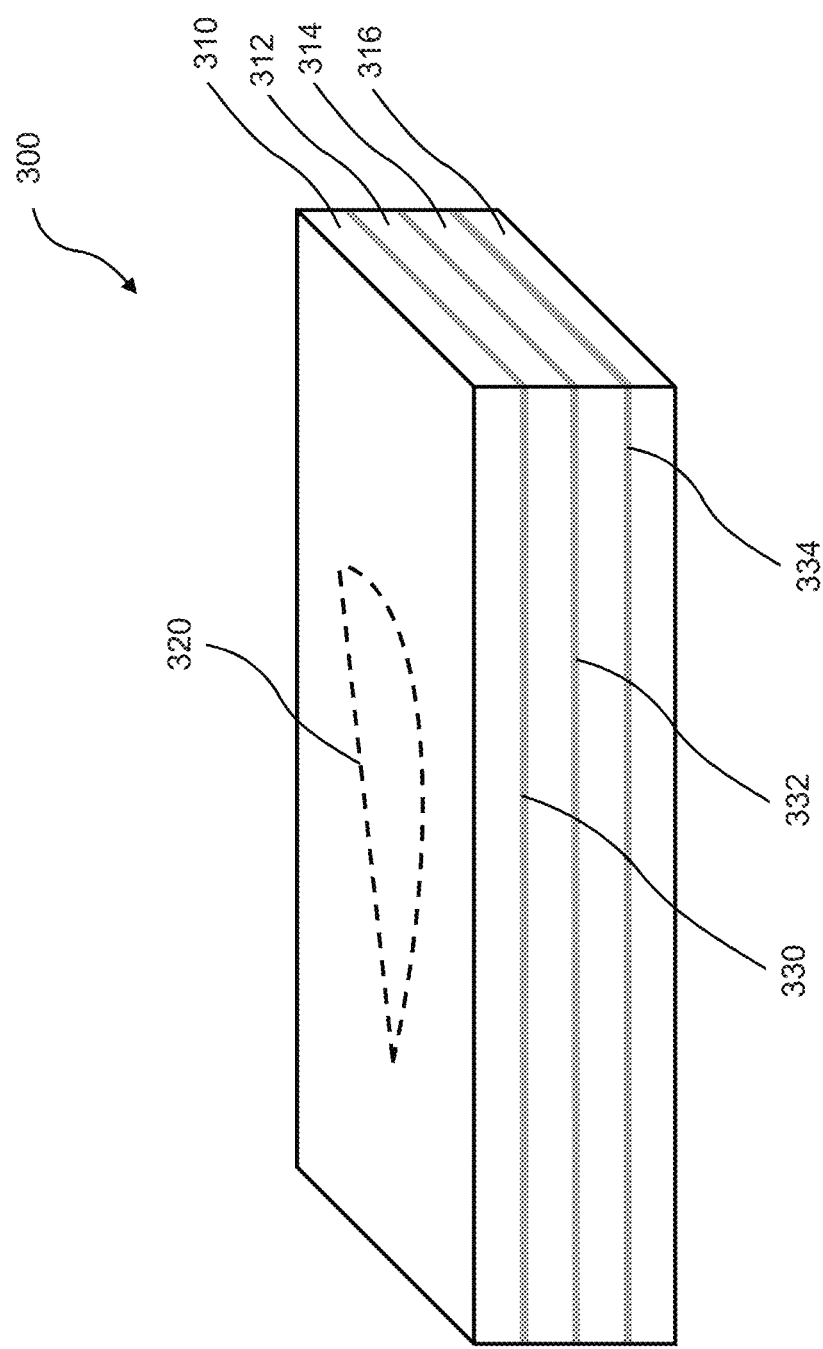
FIG. 4 shows a schematic three-dimensional view of an exemplary embodiment of an infused semi-finished fibrous pack.

FIG. 4 shows a schematic three-dimensional view of an exemplary embodiment of an infused semi-finished fibrous pack 300. The semi-finished fibrous pack 300 comprises a first infused semi-finished fibrous product 310, a second infused semi-finished fibrous product 312, a third infused semi-finished fibrous product 314, and a fourth infused semi-finished fibrous product 316, wherein one separation element 320, 332, 344 is in each case disposed between the infused semi-finished fibrous products. Furthermore, the component contour 320 of the fiber composite components to be cut out is schematically illustrated.

Figure 5:
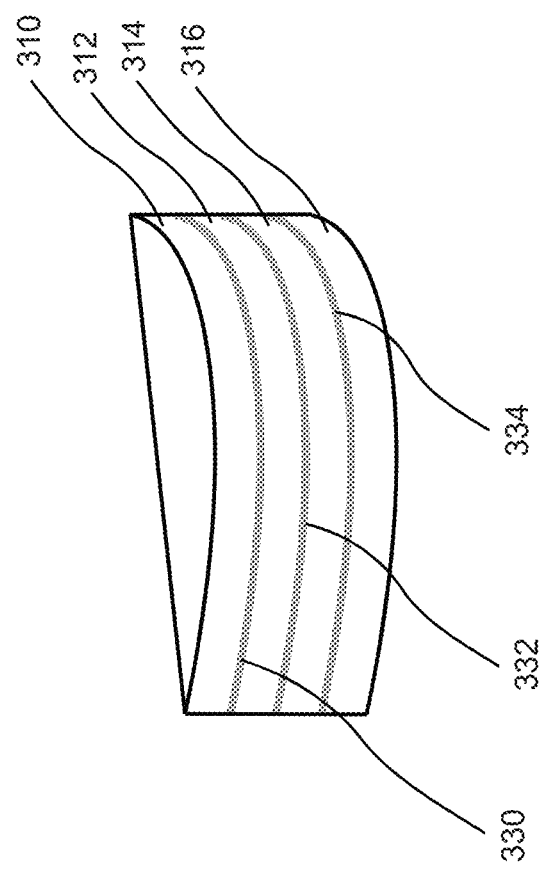
FIG. 5 shows a schematic three-dimensional view of fiber composite components cut out from the semi-finished fibrous pack shown in FIG. 4, prior to separating.

A schematic three-dimensional view of the fiber composite components cut out from the semi-finished fibrous pack shown in FIG. 4 is shown prior to separating in FIG. 5. The cutting out can have been performed by means of a water-jet cutting process, for example. It can be seen that the cut-out element does indeed already have the contour of the fiber composite components to be produced, but that a plurality of, here four, infused fiber composite components are still disposed on top of one another and one separation element 330, 332, 334 is in each case disposed between said fiber composite components. The separation takes place in each case on the separation elements 330, 332, 334 in a subsequent step so that the fiber composite components to be produced are present.

Figure 6:
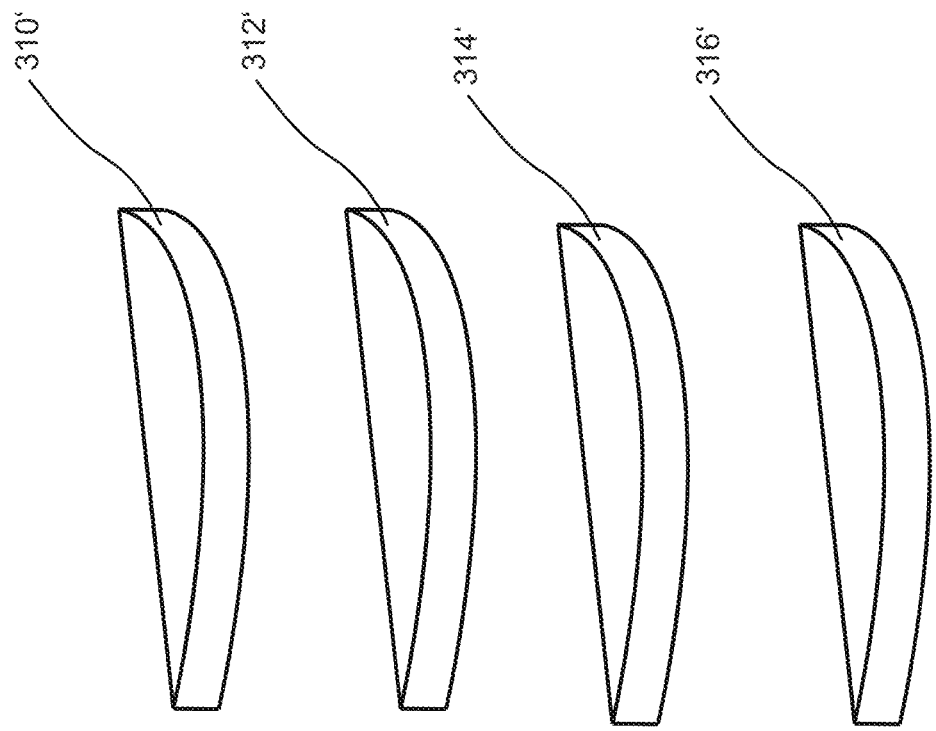
FIG. 6 shows a schematic three-dimensional view of fiber composite components cut out and separated from the semi-finished fibrous pack shown in FIG. 4.

FIG. 6 shows a schematic three-dimensional view of fiber composite components 310', 312,' 314,' 316' which have been cut out and separated in this manner from the semi-finished fibrous pack shown in FIG. 4. The fiber composite components 310', 312', 314', 316' in each case correspond substantially to the geometry of the infused semi-finished fiber products 310, 312, 314, 316, wherein the fiber composite components 310', 312', 314', 316' represent the finished components and the infused semi-finished fibrous products 310, 312, 340, 316 are intermediate products of the fiber composite components 310', 312', 314' 316', the contour thereof still having to be cut out of the semi-finished fibrous pack 300, for example, and which still have to be separated from the respective neighboring infused semi-finished fibrous products, for example. Optionally, the separation elements 330, 332, 334 and/or component parts of the separation elements 330, 332, 334 are additionally also removed from the infused semi-finished fibrous products 310, 312, 314, 316, in order for the fiber composite component 310', 312', 314', 316' to be obtained.

LIST OF REFERENCE SIGNS

100 Wind power installation
102 Tower
104 Nacelle
105 Component pack
106 Rotor
108 Rotor blade
110 Spinner
111 First fiber composite component
112 Second fiber composite component
114 Third fiber composite component
116 Multiplicity of fiber composite components
118 nth fiber composite component
150 Fluid jet
152 First fluid exit
154 Second fluid exit
200 Infused semi-finished fibrous pack
210 First infused semi-finished fibrous product
211 Second infused semi-finished fibrous product
212 Third infused semi-finished fibrous product
213 Multiplicity of infused semi-finished fibrous products having separation elements
214 (n−2)th infused semi-finished fibrous product
215 (n−1)th infused semi-finished fibrous product
216 nth infused semi-finished fibrous product
220 First separation element
221 Second separation element
222 Third separation element
224 (m−2)th separation element
225 (m−1)th separation element
226 mth separation element
230 First passage opening
231 Second passage opening
232 Third passage opening
233 Fourth passage opening
234 Fifth passage opening
235 Sixth passage opening
236 Seventh passage opening
250 Fluid jet
300 Infused semi-finished fibrous pack
310 First infused semi-finished fibrous product
310' First infused fiber composite component
312 Second infused semi-finished fibrous product
312' Second infused fiber composite component
314 Third infused semi-finished fibrous product
314' Third infused fiber composite component
316 Fourth infused semi-finished fibrous product
316' Fourth infused fiber composite component
320 Component contour
330 First separation element
332 Second separation element
334 Third separation element

We claim:
1. A method comprising:
simultaneously producing two or more fiber composite components, each of the two or more fiber composite components having a component contour, wherein the simultaneously producing comprises:
providing one or more fibrous materials, one or more planar separation elements, and one or more matrix materials, wherein the one or more planar separation elements are permeable to the one or more matrix materials;
producing a semi-finished fibrous pack by disposing the one or more fibrous materials layer-by-layer so as to form semi-finished fibrous products stacked on top of one another, wherein the one or more planar separation elements are disposed between the semi-finished fibrous products;

infusing the semi-finished fibrous pack with the one or more matrix materials; and cutting the infused semi-finished fibrous pack to form the two or more fiber composite components.

2. The method as claimed in claim 1, comprising:

separating the infused semi-finished fibrous pack at the one or more planar separation elements.

3. The method as claimed in claim 1, wherein the cutting comprises using a fluid comprising an abrasive material.

4. The method as claimed in claim 1, wherein the one or more planar separation elements are barrier films and have a plurality of passage openings.

5. The method as claimed in claim 4, wherein the plurality of passage openings are uniformly distributed throughout the respective barrier film.

6. The method as claimed in claim 4, wherein each of the barrier film comprises polyethylene.

7. The method as claimed in claim 1, wherein the one or more planar separation elements consists of at least one of:
   a permeable woven fabric;
   a mesh element;
   a chemical barrier layer; or
   an adhesive layer.

8. The method as claimed in claim 1, wherein each of the one or more planar separation elements comprises separation element portions, and the separation element portions are disposed in portions between neighboring semi-finished fibrous products.

9. The method as claimed in claim 1, wherein a respective one of the one or more separation elements is disposed completely between two neighboring semi-finished fibrous products.

10. The method as claimed in claim 1, wherein:
    a cutting direction is aligned so as to be parallel to a surface orthogonal to the one or more planar separation elements; or
    the cutting direction is aligned at an angle to the surface orthogonal of the one or more planar separation elements.

11. The method as claimed in claim 1, wherein the two or more fiber composite components have a planar geometry.

12. The method as claimed in claim 1, wherein the one or more matrix materials consists of at least one of:
    a plastic material,
    a thermoplastics material,
    a thermosetting plastics material,
    a ceramic,
    a cement,
    a concrete,
    a metal, or
    carbon.

13. The method as claimed in claim 1, wherein the one or more fibrous materials are at least one of:
    organic fibers,
    carbon fibers,
    inorganic fibers,
    glass fibers, or
    natural fibers.

\* \* \* \* \*